(12) United States Patent
Matsuda et al.

(10) Patent No.: US 7,942,232 B2
(45) Date of Patent: May 17, 2011

(54) ELECTRIC POWER STEERING APPARATUS

(75) Inventors: Kouhei Matsuda, Sagamihara (JP); Yoshinori Kogiso, Mizunami (JP)

(73) Assignee: Kayaba Industry Co., Ltd., Tokyo (JP)

( * ) Notice: Subject to any disclaimer, the term of this patent is extended or adjusted under 35 U.S.C. 154(b) by 503 days.

(21) Appl. No.: 12/187,389

(22) Filed: Aug. 7, 2008

(65) Prior Publication Data

US 2009/0065288 A1 Mar. 12, 2009

(30) Foreign Application Priority Data

Aug. 9, 2007 (JP) .................................. 2007-208001

(51) Int. Cl.
*B62D 5/04* (2006.01)
(52) U.S. Cl. .......... 180/443; 180/444; 180/446; 701/41; 701/42; 701/43
(58) Field of Classification Search .................. 180/443, 180/444, 446; 701/41, 42, 43
See application file for complete search history.

(56) References Cited

U.S. PATENT DOCUMENTS

| | | | | |
|---|---|---|---|---|
| 6,046,560 A * | 4/2000 | Lu et al. | ......................... | 318/432 |
| 6,250,418 B1* | 6/2001 | Shimizu et al. | ............... | 180/422 |
| 6,907,334 B2* | 6/2005 | Yoshida et al. | ................. | 701/41 |
| 2004/0054456 A1* | 3/2004 | Yoshida et al. | ................. | 701/41 |
| 2004/0133323 A1* | 7/2004 | Kodama et al. | ................. | 701/41 |
| 2004/0222035 A1* | 11/2004 | Yoneda et al. | ............... | 180/443 |
| 2007/0000718 A1* | 1/2007 | Sawano et al. | ............... | 180/446 |
| 2007/0165431 A1* | 7/2007 | Gunji | .............................. | 363/98 |
| 2009/0066286 A1* | 3/2009 | Gunji | ............................ | 318/490 |

FOREIGN PATENT DOCUMENTS

| | | |
|---|---|---|
| JP | 4-251596 | 7/1992 |
| JP | 3154665 | 2/2001 |
| JP | 2002-46630 | 12/2002 |

* cited by examiner

*Primary Examiner* — Paul N Dickson
*Assistant Examiner* — Marlon A Arce
(74) *Attorney, Agent, or Firm* — Hiroe & Associates; Taras P. Bemko

(57) ABSTRACT

A controller samples a motor current value detected by a motor current detector at a sampling start timing for turning on a switching device to start holding in a motor current hold section, and fetches the motor current value held in the motor current hold section at a hold timing for turning off the switching device. The sampling start timing and the hold timing are variable.

17 Claims, 7 Drawing Sheets

ELECTRIC POWER STEERING APPARATUS

BACKGROUND OF THE INVENTION

The present invention relates to an electric power steering apparatus.

FIG. 4 is a block diagram of an electric power steering apparatus 100 described in Japanese Patent No. 3154665. In the drawing, controller 101 controls a steering auxiliary motor M based on a vehicle speed output from a vehicle speed sensor and a steering torque output from a torque sensor.

In the drawing, reference numeral 102 denotes an H bridge circuit. The H bridge circuit 102 is driven by an FET driving circuit 103. The FET driving circuit 103 is subjected to PWM (pulse-width modulation) control by the controller 101 based on a PWM signal.

The controller 101 obtains a difference between a current command value associated with the vehicle speed and the steering torque, and a current actually flowing through the steering auxiliary motor M. The controller then performs PWM control with respect to the FET driving circuit 103 based on this difference.

The current actually flowing through the steering auxiliary motor M is obtained by detecting a voltage across a motor current detection resistance 104.

The voltage across the motor current detection resistance 104 is supplied to a sample-hold circuit 105 and held as a voltage across a capacitor C1 in the sample-hold circuit 105.

The voltage held in the capacitor C1 is input to an operational amplifier 106 as a voltage across the input terminals of the operational amplifier 106. The voltage is amplified in the operational amplifier 106.

An output from the operational amplifier 106 is supplied to a base of a PNP transistor Q10 to turn the transistor Q10 on, which causes a collector current to flow. The collector current flows through a collector resistance R14 and is converted into a voltage, which is read into the controller 101. Since the collector current in the PNP transistor Q10 is associated with a magnitude of the voltage across the motor current detection resistance 104, the controller 101 can obtain a magnitude of the current actually flowing through the steering auxiliary motor M based on the magnitude of the collector current.

However, this conventional electric power steering apparatus 100 has the following disadvantage. Since the operational amplifier 106 generally has an offset voltage, when a current flowing through the motor current detection resistance 104 is small, the current cannot be detected because of the influence of the offset voltage. Therefore, there is a problem in that accurate assist control cannot be executed by the electric power steering apparatus 100.

Japanese Published Patent Application No. 1992-251596 discloses another electric power steering apparatus, in which an influence of an offset voltage is eliminated. FIG. 5 illustrates the device described in that document. A voltage across a shunt resistance Rs is detected by a differential circuit 51. A predetermined voltage Vr is applied to a positive input terminal of the differential circuit 51. The voltage detected by the differential circuit 51 is supplied to a negative input terminal of a comparator 53. The comparator 53 executes half-wave rectification. A connection point between the shunt resistance Rs and a battery 48 is connected to a positive input terminal of a differential circuit 52. The predetermined voltage Vr is also applied to the positive input terminal of this differential circuit 52. The differential circuit 52 compensates for an offset voltage generated by the differential circuit 51 and the comparator 53.

However, in the device described in Japanese Published Patent Application No. 1992-251596, which is thus configured to compensate for the offset voltage, there is a problem in that the circuit configuration is complicated and selection of its respective elements is troublesome. A device that can easily and accurately execute assist control by enabling compensation for the offset voltage but with a simple structure has thus been demanded.

Another known electric power steering apparatus is described in Japanese Published Patent Application No. 2002-46630.

In the electric power steering apparatus disclosed in that document, a current value flowing through a motor current detection resistance is held in a peak hold circuit and then fetched into a controller.

FIG. 6 shows the peak hold circuit 60 described in Japanese Published Patent Application No. 2002-46630. This peak hold circuit 60 includes a first peak hold circuit 61 and a second peak hold circuit 62. Operation of the first peak hold circuit 61 will now be explained. When a motor current flows through a motor current detection resistance 56, a potential at a non-inverting input terminal of a comparator 61a (a potential at a point U) is increased. When this potential at the non-inverting input terminal of the comparator 61a is higher than a potential at an inverting input terminal of the comparator 61a, the comparator 61a is turned off and a diode 61c is turned on. As a result, a current flows through a capacitor 61f via a resistance 61g and the diode 61c, and the capacitor 61f is charged. Based on this charge, when the potential at the non-inverting input terminal of the comparator 61a becomes higher than the potential at the non-inverting input terminal of the comparator 61a, the comparator 61a is turned on, the diode 61c is turned off, charging of the capacitor 61f is stopped, and discharging of the capacitor 61f is carried out via resistances 61d and 61e. An operational amplifier 61b converts a potential VP1 at a point P1 into a low impedance and outputs this impedance to a channel CHI of an ADC 43. Respective values of elements in the first peak hold circuit 61, e.g., resistance values R1 and R2 or a capacitance of the capacitor 61f are selected in such a manner that a maximum value of an analog voltage VP1 (the analog voltage VP1 when a motor current has a maximum value that can be taken under control) becomes equal to a maximum value of a voltage that can be subjected to analog/digital conversion by the ADC 43.

However, the invention described in Japanese Published Patent Application No. 2002-46630 has the following problem. FIG. 7(A) shows a waveform of a PWM signal. FIG. 7(B) depicts a voltage generated in the motor current detection resistance 56. Furthermore, as shown in FIG. 7(B), a time constant that is determined based on the capacitance of the capacitor 61f and the resistance values R1 and R2 of the resistances 61d and 61e is set with respect to the capacitor 61f so that the same voltage as the voltage generated in the motor current detection resistance 56 can be produced. However, when the time constant is too large, discharge of the voltage in the capacitor 61f takes a long time, and a voltage generated in the motor current detection resistance 56 in synchronization with the next PWM signal is thereby added before the voltage in the capacitor 61f is completely discharged. Therefore, the voltage in the capacitor 61f becomes a voltage higher than the voltage currently generated in the current detection resistance 56, thus leading to a problem in that the motor current cannot be accurately detected.

When the time constant is too small, the capacitor 61f cannot hold the voltage for a fixed time and can readily discharge the voltage. As a result, the voltage in the capacitor 61f is discharged before the controller reliably fetches the voltage in the capacitor 61f, thereby leading to a problem in that the controller cannot execute accurate assist control.

That is, in the invention disclosed in Japanese Published Patent Application No. 2002-46630, when performing accurate assist control, there occurs a problem that adjustment of the time constant determined based on the capacitor 61f and the resistance values R1 and R2 of the discharge resistances 61d and 61e is complicated.

Therefore, in view of the problems in the conventional technology, it is an object of the present invention to provide an electric power steering apparatus that has a simple structure and which enables highly accurate detection of a current value actually flowing through a steering motor to execute accurate assist control.

SUMMARY OF THE INVENTION

The invention provides an electric power steering apparatus. A preferred embodiment of the invention may include a vehicle speed sensor that detects a vehicle speed, a torque sensor that detects a steering torque of a steering device such as a steering wheel, a steering auxiliary motor for the steering device, a motor current detector that detects a value of a motor current actually flowing through the motor, and a controller that obtains a difference between a current command value calculated based on the vehicle speed and the steering torque and the value of the motor current actually flowing through the motor to perform PWM control with respect to an operation of the motor. A motor current hold section that holds the value of the motor current detected by the motor current detector may be included, with a switching device being provided between the motor current detector and the motor current hold section. The controller can sample the motor current value detected by the motor current detector at a sampling start timing for turning on the switching device to start holding in the motor current hold section, and fetching the motor current value held in the motor current hold section at a hold timing for turning off the switching device. Finally, the sampling start timing and the hold timing can be variable.

The controller can change the sampling start timing and the hold timing without restraint by controlling opening and closing of the switching device in accordance with, e.g., a magnitude of a pulse width of the PWM signal, thereby executing accurate assist control.

DETAILED DESCRIPTION OF PREFERRED EMBODIMENTS

Figure 1:
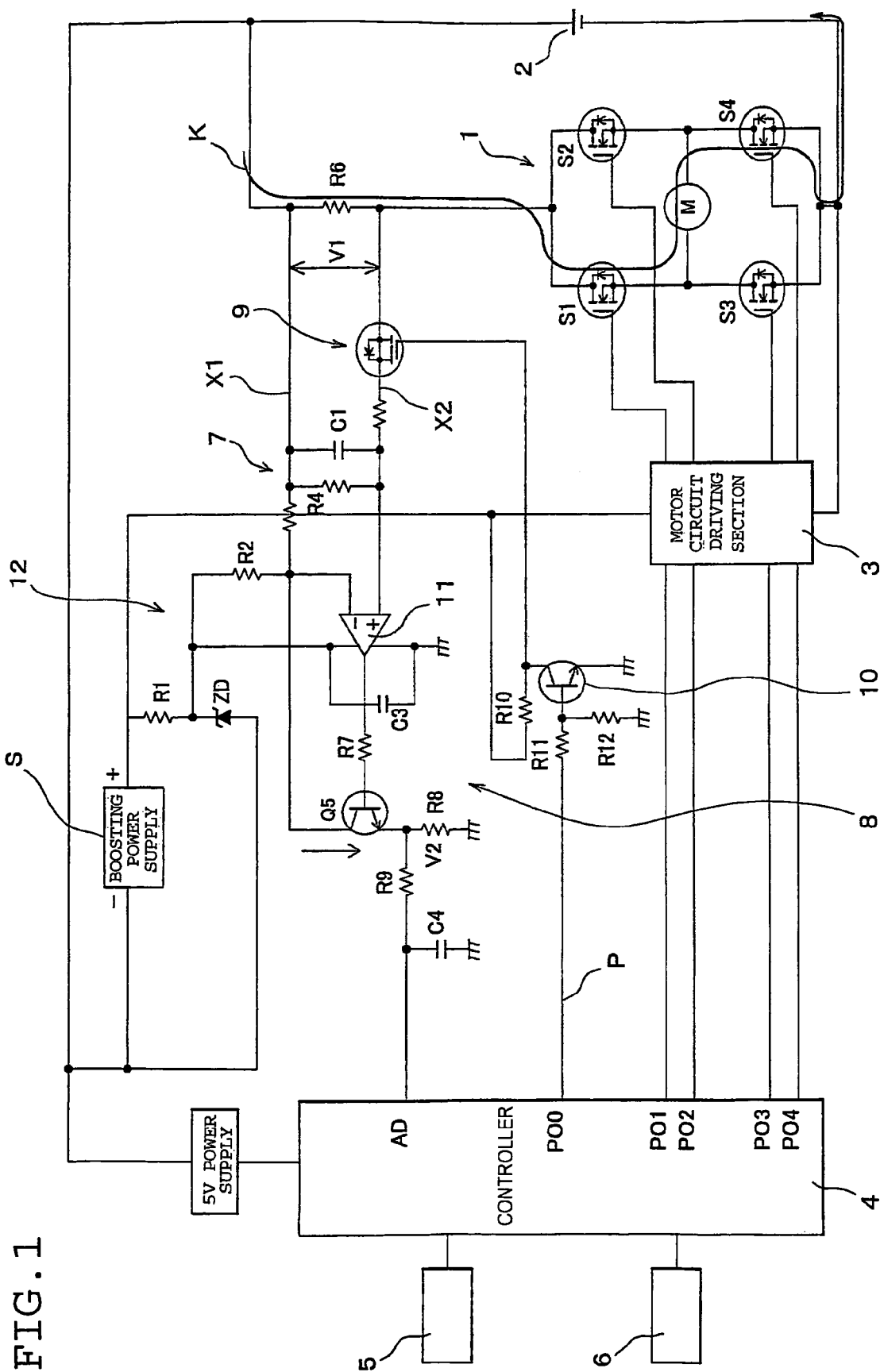
FIG. 1 is a block diagram of an example of an electric power steering apparatus according to an embodiment of the invention.
Figure 2:
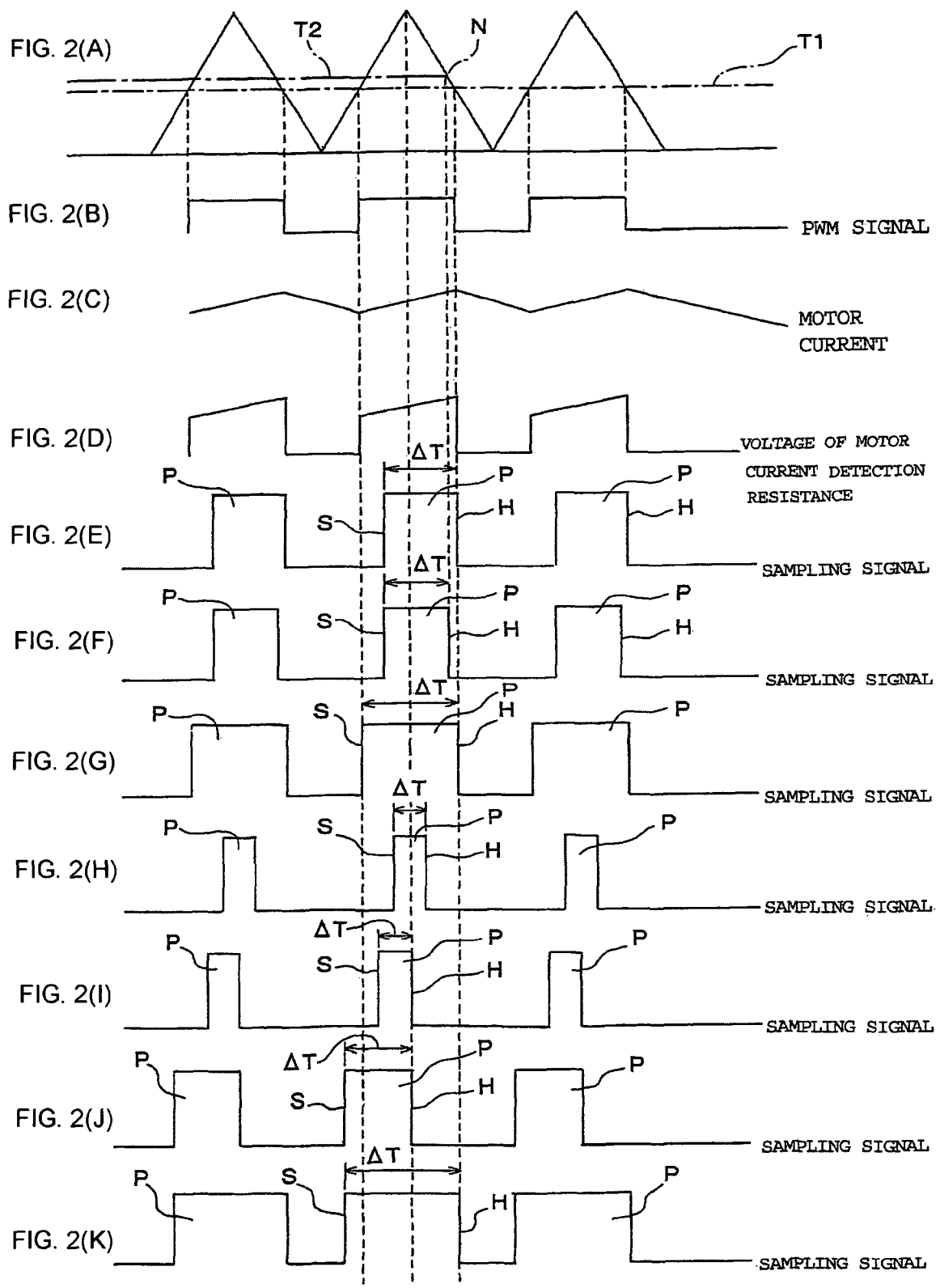
FIGS. 2(A)-2(K) are views showing relationships between a PWM signal, a motor current, a voltage across a motor current detection resistance, and a sampling signal according to several distinct embodiments.
Figure 3:
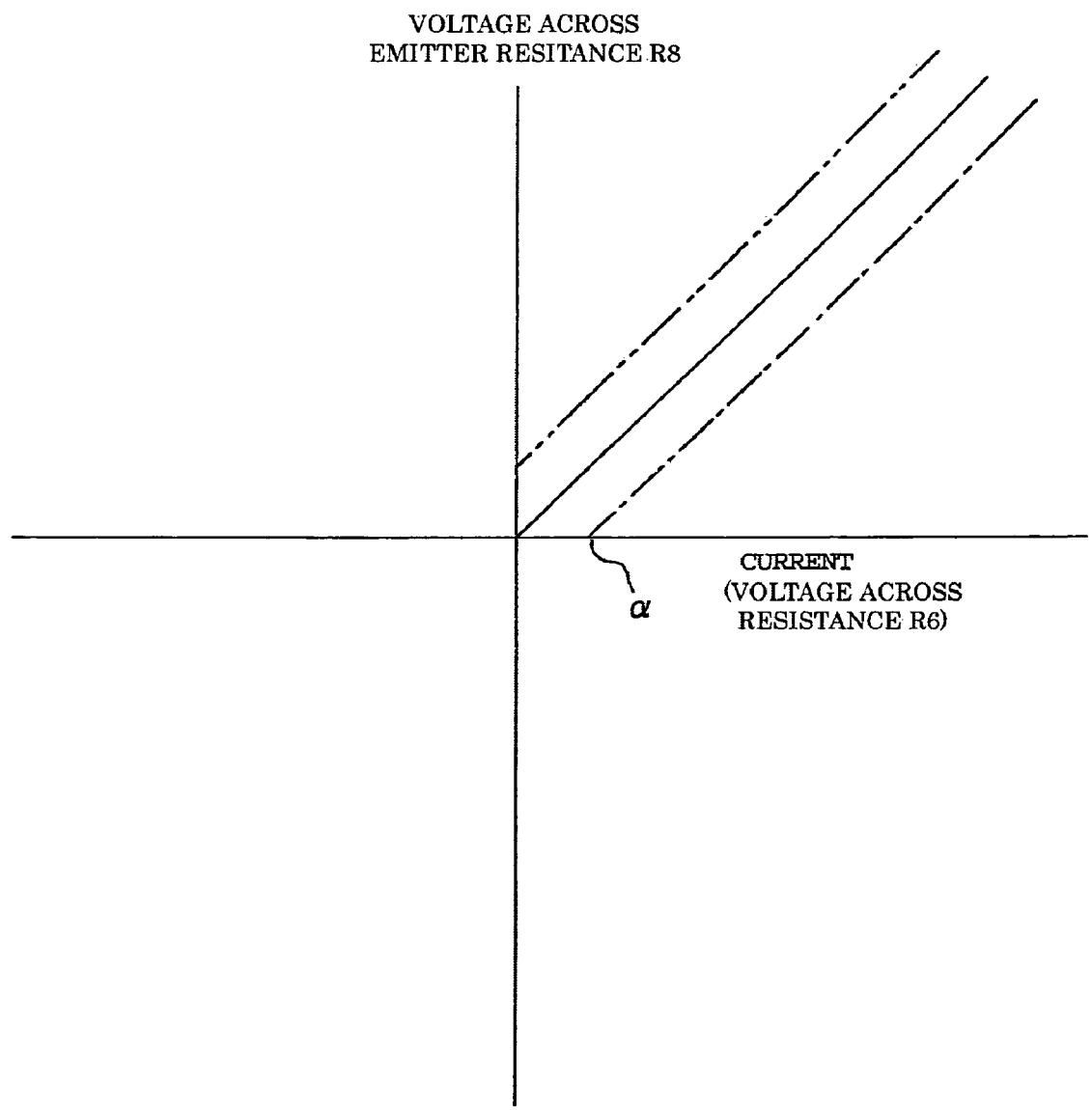
FIG. 3 is a diagram showing characteristics of an operational amplifier used in the embodiment.
Figure 4:
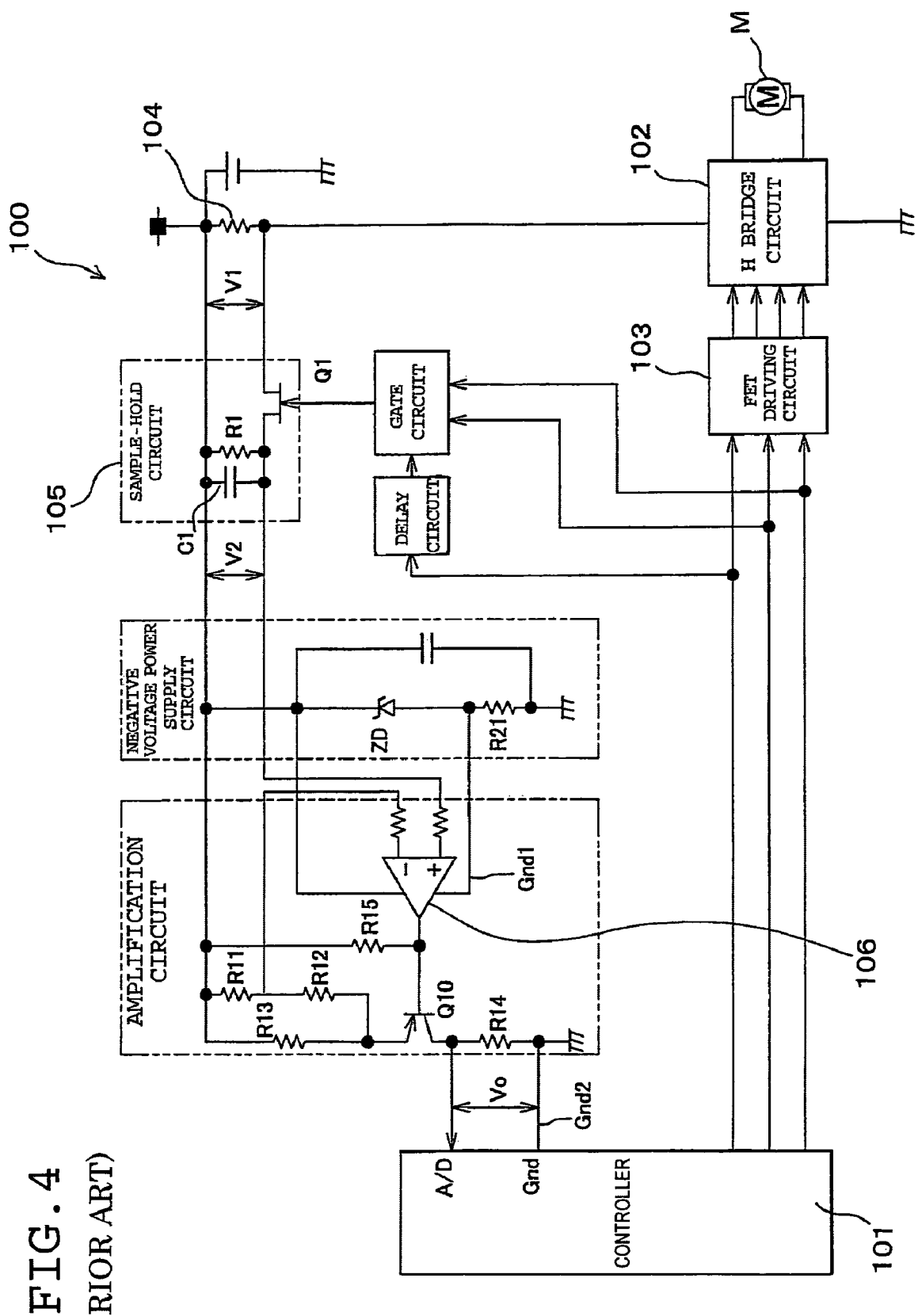
FIG. 4 is a block diagram of an electric power steering apparatus in a conventional device.
Figure 5:
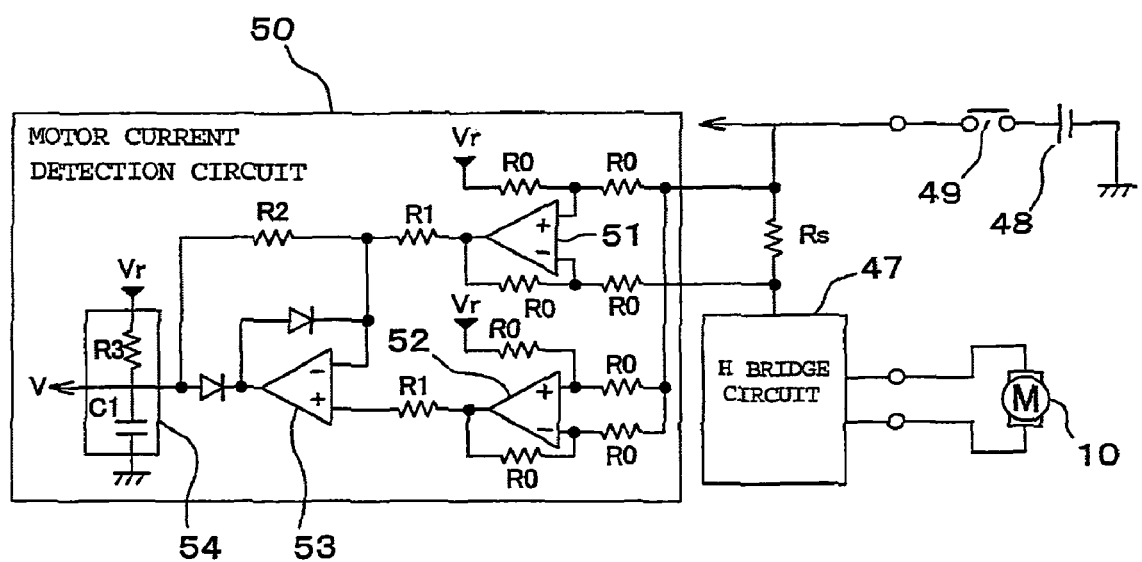
FIG. 5 is a block diagram of an electric power steering apparatus in a conventional technology.

FIGS. 1 to 3 depict embodiments of the present invention. In FIG. 1, reference numeral 1 denotes a motor circuit. The motor circuit 1 is formed by bridge-connecting four switching elements S1 to S4. Each of these switching elements includes, e.g., an FET. The motor circuit 1 includes two of the switching elements S1 and S2 on a high side, the other two switching elements S3 and S4 on a low side, and a steering auxiliary motor M between the two switching elements S1 and S2 on the high side and the two switching elements S3 and S4 on the low side.

The motor circuit 1 is connected to a motor power supply 2 through a motor current detection resistance R6. The motor current detection resistance R6 includes a motor current detector.

The four switching elements S1 to S4 in the motor circuit 1 are connected to a boosting power supply S to receive power, and controlled by a motor circuit driving section 3. The motor circuit driving section 3 is controlled by controller 4 to perform PWM control with respect to the switching elements in the motor circuit 1 based on a PWM signal. The controller 4 comprises, e.g., a microcomputer. Additionally, the switching elements S1 and S4, and S2 and S3 in diagonal directions form respective pairs. Further, the boosting power supply S is connected with the motor power supply 2 to boost a voltage in the motor power supply 2.

The controller 4 calculates a current command value based on a vehicle speed output from a vehicle speed sensor 5 and a steering torque output from a torque sensor 6. The controller obtains a difference between the current command value and a current value actually flowing through the steering auxiliary motor M and performs PWM control with respect to the motor circuit 1 based on this difference.

A motor current hold section 7 and a motor current output section 8 are provided between the motor current detection resistance R6 and the controller 4. A value of the motor current detection resistance R6 is fetched into the controller 4 through the motor current hold section 7 and the motor current output section 8.

A switching device 9 is provided between the motor current detection resistance R6 and the motor current hold section 7. The switching device 9 is controlled to switch on and off by a switching controller 10.

The motor current hold section 7 includes a capacitor C1 and a discharge resistance R4 connected in parallel to the motor current detection resistance R6. A first reference line X1 and a second reference line X2 are provided at respective ends of the motor current detection resistance R6. The capacitor C1 and the discharge resistance R4 are provided between the first reference line X1 and the second reference line X2. The first reference line X1 is connected to a positive side of the motor power supply 2 and thus has a fixed potential.

The motor current output section 8 includes an operational amplifier 11 and a transistor Q5 at the rear of the operational amplifier 11. A negative terminal of the operational amplifier 11 is connected to the first reference line X1, with a positive terminal of the operational amplifier connected to a second reference line X2. An output from the operational amplifier 11 is connected to a base of the transistor Q5 through a resistance R7. An emitter resistance R8 is connected to an emitter side of the transistor Q5, and a collector side of the transistor Q5 is connected to the first reference line X1.

A current flowing through the emitter side of the transistor Q5 is converted into a voltage by the emitter resistance R8 and input to an AD terminal of the controller 4 through a resistance R9 and a capacitor C4.

An offset circuit 12 is connected to the first reference line X1. The offset circuit 12 includes the boosting power supply S, a first resistance R1 with a negative side connected to a positive side of the boosting power supply S, a zener diode ZD with a cathode side connected to the other side of the first resistance R1 and an anode side connected to a positive side of the motor power supply 2, and a second resistance R2 between the cathode side of the zener diode ZD and the first reference line X1.

The switching device 9 is provided on the second reference line X2. The switching device 9 can be, e.g., a MOSFET of an N channel. If the switching device 9 is formed of the N-channel MOSFET, the switching device 9 is turned on when a high voltage is applied to a gate side of the switching device 9, and turned off when a low voltage is applied to the gate of the switching device 9.

The switching control section 10 can include a grounded-emitter NPN transistor. A base side of this transistor is connected with a terminal PO0 of the controller 4 through a resistance R11 and grounded through a resistance R12. A collector side of this transistor is connected at a positive side of the boosting power supply S through a resistance R10 and also connected to a gate side of the MOSFET that constitutes the switching device 9. A sampling signal P is output from the controller 4 to a base side of the switching control section 10.

The electric power steering apparatus according to this embodiment performs PWM control with respect to the switching elements S1 and S2 alone. As the controller 4 turns the switching elements S1 and S2 in the motor circuit 1 on and off, the steering auxiliary motor M is subjected to PWM control based on a PWM signal. When the switching element S1 is turned on, for example, as shown in FIG. 1, a current K flows through the motor circuit 1. When the current K flows through the motor circuit 1 in this manner, a motor current flows through the motor current detection resistance 6, and a voltage V1 is produced between the first reference line X1 and the second reference line X2.

On the other hand, when the switching element S1 is turned off, since the current does not flow through the motor current detection resistance R6, the voltage is not produced between the first reference line X1 and the second reference line X2. In this case, a regenerative current produced in the steering auxiliary motor M circulates in a path extending from the steering auxiliary motor M and returning to the steering auxiliary motor M via the diodes of the switching element S4 and the switching element S3, and is then annihilated.

When the switching element S2 is turned on, the current flows through the motor circuit 1, the motor current flows through the motor current detection resistance 6, and the voltage V1 is produced between the first reference line X1 and the second reference line X2. When the switching element S2 is turned off, since the current does not flow through the motor current detection resistance R6, the voltage is not produced between the first reference line X1 and the second reference line X2. In this case, the regenerative current produced in the steering auxiliary motor M circulates in a path extending from the steering auxiliary motor M and returning to the steering auxiliary motor M via the diodes of the switching element S3 and the switching element S4, and is then annihilated.

When the sampling signal P is supplied from the controller 4 to the switching control section 10 in synchronization with the switching elements S1 or S2 being turned on and the switching control section 10 is thereby turned on, a high voltage is applied to an FET of the switching device 9 to turn the switching device on. As a result, a voltage across the capacitor C1 becomes the voltage V1 between the first reference line X1 and the second reference line X2.

The voltage V1 of the capacitor C1 is applied to a part of the circuit between the input terminals of the operational amplifier 11. In this case, a current flows in such a manner that an imaginary short-circuit occurs in the operational amplifier 11. This current flows through the collector side of the transistor Q5 as indicated by an arrow in FIG. 1 to become an emitter current, and a voltage V2 is generated in the emitter resistance R8.

This voltage V2 is read into the controller 4 from the terminal AD of the controller 4. This voltage V2 is associated with the voltage V1 across the motor current detection resistance R6. Detecting an increase or decrease in this voltage V2 enables the detection of an increase or decrease of the voltage V1.

A voltage of the capacitor C1 can be read by the controller 4 with appropriate timing.

First, based on FIGS. 2(A)-2(K), descriptions will be given of relationships between a triangular wave (shown in FIG. 2(A)) that is a basis for shaping of a pulse wave of the PWM signal used for PWM control, timings of rising and falling of the PWM signal (shown in FIG. 2(B)), a waveform of the motor current (shown in FIG. 2(C)), the voltage across the motor current detection resistance (shown in FIG. 2(D)), and the sampling signal P (shown in FIGS. 2(E) to (K)).

The pulse wave of the PWM signal used for the PWM control (shown in FIG. 2(B)) can be formed by using, e.g., a limiter circuit having a variable threshold value. The pulse wave can be shaped into a rectangular wave by passing the triangular wave depicted in FIG. 2(A) to, e.g., the limiter circuit. FIG. 2(B) shows the PWM signal shaped into a rectangular wave with a fixed pulse width by passing the triangular wave to the limiter circuit having a threshold value T1.

The sampling signal P is a signal that is supplied from the controller 4 to the switching control section 10 and which turns the switching device 9 on and off. A pulse width of the sampling signal P is called a sampling time ΔT. Although the sampling signal P essentially has a negative voltage, it will be explained as having a positive voltage for the sake of convenience.

When the switching control section 10 is activated to turn on the switching device 9 based on a rise of the sampling signal P, sampling of the voltage in the motor current detection resistance R6 begins. Rising of the sampling signal P corresponds to a sampling start timing. When the switching device 9 is turned off based on a fall of the sampling signal P, sampling is stopped. The controller 4 fetches the voltage V1 in the capacitor C1 in synchronization with falling of the sampling signal P. A time of falling of the sampling signal P corresponds to a hold timing H.

The controller 4 can change the sampling start timing S and the hold timing H.

Figure 6:
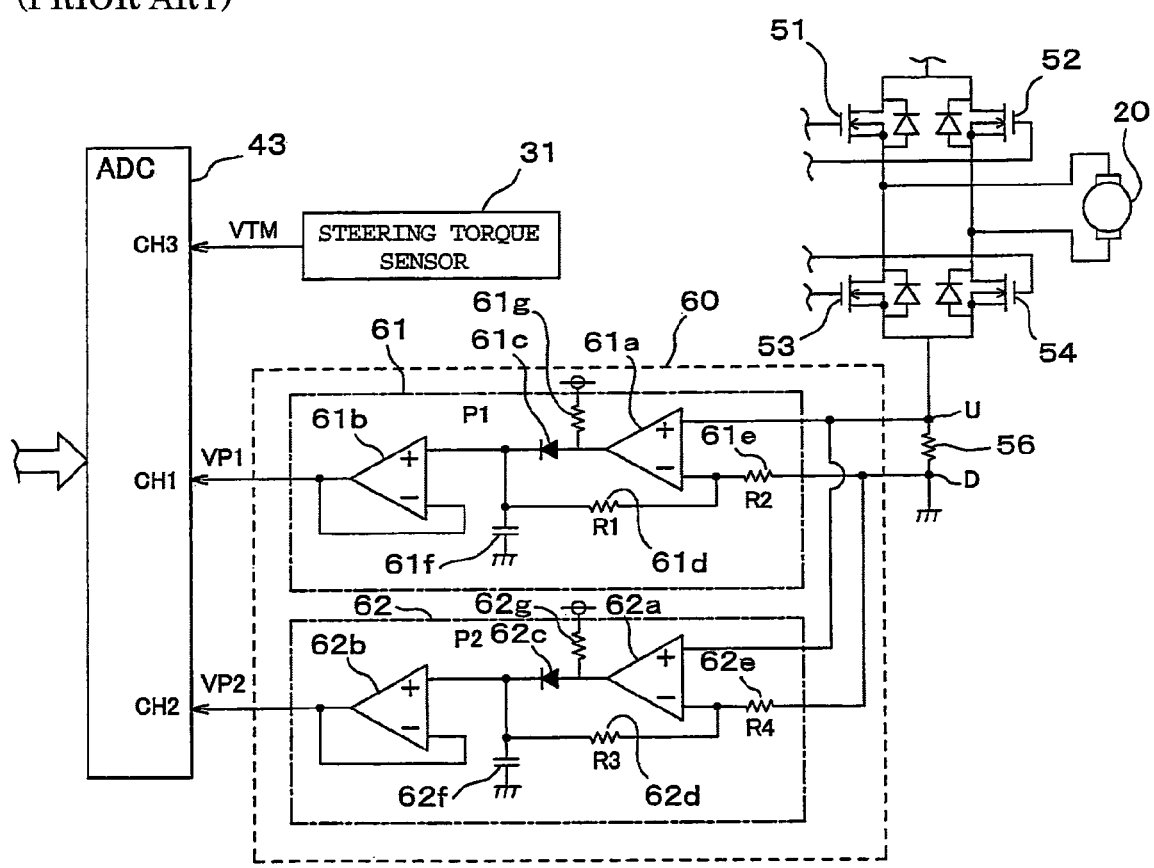
FIG. 6 is a block diagram of an electric power steering apparatus in a conventional device.
Figure 7A:
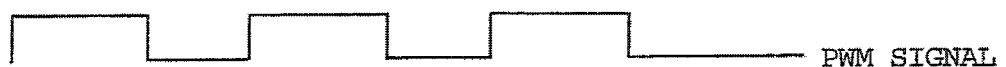
FIG. 7(A) is a view showing a waveform of a PWM signal.
Figure 7B:
FIG. 7(B) is a view showing a waveform of a voltage generated in a motor current detection resistance in a conventional electric power steering apparatus.

Since the sampling start timing S and the hold timing H can be changed, the following effect can be achieved. In the invention disclosed in Japanese Published Patent Application No. 2002-46630 and depicted in FIG. 6, the time constant determined based on a capacitance of the capacitor and resistance value of the discharge resistances must be highly accurately adjusted, and this adjustment is complicated. In the present embodiment, though, the controller 4 can change the sampling start timing S and the hold timing H without restraint by controlling times at which the switching device 9 is turned on or off. As a result, the controller 4 can start sampling of a motor current value with optimum timing and can read the motor current value with optimum timing, and thereby execute optimum assist control.

Cases in which the sampling start timing S and the hold timing H are changed in various embodiments will now be explained.

FIG. 2(E) illustrates a first embodiment. This first embodiment corresponds to a case in which the sampling time ΔT is fixed and the hold timing H is synchronized with falling of the PWM signal. In this first embodiment, since a time for subjecting a motor current value detected in the motor current detection resistance R6 to AD conversion can be sufficiently assured by providing enough sampling time ΔT, an analog value can be converted into a digital value even if the AD converter requires a long conversion time. Furthermore, sampling software can be simplified by fixing the sampling time ΔT. Moreover, since the hold timing H is synchronized with falling of the PWM signal, the hold timing H does not have to be independently controlled, which facilitates its implementation.

FIG. 2(F) shows a second embodiment. In this second embodiment, the hold timing H can be set immediately before falling of the PWM signal. As to the hold timing H in this case, a point N where a threshold value T2 which is not smaller than the threshold value T1 crosses the triangular wave can be determined as the hold timing H.

FIG. 2(G) shows a third embodiment in which the sampling start timing S can be synchronized with rising of the PWM signal, and the hold timing H can be synchronized with falling of the PWM signal. When the sampling start timing S is synchronized with rising of the PWM signal and the hold timing H is synchronized with falling of the PWM signal, the sampling start timing S and the hold timing H can be readily assured without preparing a dedicated timer or program software.

FIG. 2(H) shows a fourth embodiment in which the center of the sampling time ΔT, i.e., the center of a pulse width of the sampling signal, matches with the center of a pulse width of the PWM signal, and in which the sampling time ΔT is fixed. In this case, as shown in FIG. 2(D), a substantial average value of the voltage across the motor current detection resistance R6, which is gradually increased when the PWM signal is ON, can be detected, and a substantial average value of the motor current can thereby be detected, thus executing assist control according to an actual state based on this substantial average value. When the sampling time ΔT is set to a fixed time that is not smaller than the time required for AD conversion, an AD converter that requires a relatively long conversion time can be used. Furthermore, when the sampling time ΔT is fixed, software required for sampling can be simplified.

FIG. 2(I) shows a fifth embodiment in which the sampling signal P is output before a timing at the center of a pulse width of the PWM signal, and the center of the pulse width of the PWM signal is determined as the hold timing H. In this case, as shown in FIG. 2(D), the controller 4 can detect an average value of the voltage across the motor current detection resistance R6, which is gradually increased when the PWM signal is ON, and can thereby detect an average value of the motor current, thus executing ideal assist control according to an actual state based on this average value.

A sixth embodiment will now be explained. In this sixth embodiment, the sampling start timing S and the hold timing H can be changed in accordance with a large current region and a small current region. In the large current region, as shown in FIG. 2(J), the sampling start timing S is provided before the rise of the PWM signal, and the hold timing H is matched with the center of the pulse width of the PWM signal. In the small current region, as shown in FIG. 2(G), the sampling start timing S is synchronized the rise of the PWM signal, and the hold timing H is synchronized with falling of the PWM signal.

In the large current region, when the sampling start timing S is provided before rising of the PWM signal and the hold timing H is synchronized with the center of the pulse width of the PWM signal as shown in FIG. 2(J), the controller 4 can detect an average value of the voltage across the motor current detection resistance R6, which is gradually increased when the PWM signal is ON, and can thereby detect an average value of the motor current as shown in FIG. 2(D), thus executing ideal assist control according to an actual state based on this average value. Moreover, when the sampling start timing S is provided before rising of the PWM signal, the relatively long sampling time ΔT from the sampling start timing S to the hold timing H can be assured, and hence an AD converter which requires a relatively long processing time for AD conversion can be used.

Additionally, in the small current region, when the sampling start timing S is synchronized with rising of the PWM signal and the hold timing H is synchronized with falling of the PWM signal as shown in FIG. 2(G), the controller 4 can accurately synchronize the sampling start timing S with rising of the PWM signal and also synchronize the hold timing H with falling of the PWM signal to precisely fetch the voltage V1 generated in the motor current detection resistance R6 even in the small current region where the pulse width of the PWM signal is narrowed, thus executing accurate assist control based on the voltage V1.

A seventh embodiment will now be explained. In this seventh embodiment, the sampling start timing S can be synchronized with rising of the PWM signal and the hold timing H can be synchronized with falling of the PWM signal in the large current region as shown in FIG. 2(G), whilst the sampling start timing S is provided before rising of the PWM signal and the hold timing H can be synchronized with falling of the PWM signal in the small current region as shown in FIG. 2(K).

In this case, in the large current region, when the sampling start timing S and the hold timing H are synchronized with rising and falling of the PWM signal, the sampling start timing S and the hold timing H can be readily assured without preparing a dedicated timer or program software.

Further, in the small current region, since sampling can be started without falling behind rising of the PWM signal by providing the sampling start timing S before rising of the PWM signal, sampling can be accurately performed even if a duty ratio of the PWM signal is small. Furthermore, when the hold timing H is synchronized with falling of the PWM signal, the hold timing H can be easily assured without preparing a dedicated timer or program software. Providing the hold timing H in synchronization with the center of the pulse width of the PWM signal is ideal in that sampling an average value of the motor current is most preferable, but a sampled value does not have a large difference from an ideal value even if the hold timing H is synchronized with falling of the PWM signal rather than the center of the pulse width of the PWM signal since the pulse width of the PWM signal is very narrow in the small current region.

An eighth embodiment will now be explained. In this eighth embodiment, as shown in FIG. 2(G), the sampling start timing S is synchronized with rising of the PWM signal, the hold timing H is synchronized with falling of the PWM signal in the large current region, and the sampling time ΔT is fixed in the small current region in addition to the requirements explained in connection with the seventh embodiment.

In this eighth embodiment, in the large current region, when the sampling start timing S and the hold timing H are synchronized with rising and falling of the PWM signal, the sampling start timing S and the hold timing H can be readily assured without preparing a dedicated timer or program software.

Further, in the small current region, since a time required to perform AD conversion with respect to a motor current value detected by the motor current detection resistance R6 can be sufficiently assured by providing enough sampling time ΔT, in addition to the function and the effect in the small current region explained in the seventh embodiment, an analog value can be converted into a digital value even if an AD converter requiring a long conversion time is used. Furthermore, software for sampling can be simplified by fixing the sampling time ΔT.

A function of the offset circuit 12 will now be explained. Although a fixed potential is generated on the cathode side of the zener diode ZD when a current supplied from the boosting power supply S passes through the first resistance R1, the fixed potential is maintained by a zener effect of the zener diode ZD. Therefore, a fixed current associated with a voltage between the potential on the cathode side of the zener diode ZD and the first reference line X1 flows through the second resistance R2. Moreover, when this current flows through the emitter resistance R8 of the transistor Q5, a voltage based on the current supplied from the boosting power supply S is constantly added to this emitter resistance R8. This state will now be explained with reference to FIG. 3.

In FIG. 3, the abscissa represents a current value flowing through the motor current detection resistance R6, and the ordinate represents a voltage generated in the emitter resistance R8 of the transistor Q5. In FIG. 3, the alternate long and short dashed line represents characteristics when an offset voltage of the operational amplifier 11 is negative, the chain double-dashed line represents characteristics when the offset voltage of the operational amplifier 11 is positive, and the solid line represents ideal characteristics when the operational amplifier 11 does not have the offset voltage. In this embodiment, by providing the offset circuit 12, the offset voltage of the operational amplifier is absorbed when the characteristic line moves up from a state indicated by the alternate long and short dash line to a state indicated by the solid line or a state indicated by the chain double-dashed line in FIG. 3.

That is, as indicated by the alternate long and short dash line in FIG. 3, in a case where the offset voltage is negative, when a small current that is not higher than a point α where the characteristic line crosses the abscissa flows through the motor current detection resistance R6, this current cannot be detected. That is, when the small current flows through the motor current detection resistance R6, this small current cannot be detected.

However, in this embodiment the offset circuit 12 is connected with one terminal of the operational amplifier 11, and a voltage that is not smaller than the offset voltage of the operational amplifier 11 is applied to the emitter resistance R8 based on a current flowing through the offset circuit 12. That is, when a voltage that is not smaller than the offset voltage is applied to the emitter resistance R8 from the boosting power supply S side, the offset voltage of the operational amplifier 11 is canceled out, thereby demonstrating the characteristics indicated by the chain double-dashed line or the solid line in FIG. 3. Therefore, as indicated by the chain double-dashed line or the solid line in FIG. 3, even if a minute electric current flows through the motor current detection resistance R6, this minute electric current can be detected as the voltage across the emitter resistance R8, thereby ensuring highly accurate assist control.

What is claimed is:

1. An electric power steering apparatus comprising:
    a vehicle speed sensor operable to detect a vehicle speed;
    a torque sensor operable to detect a steering torque of a steering member;
    a steering auxiliary motor configured to provide torque for steering assistance;
    a motor current detector operable to detect a value of a motor current actually flowing through the auxiliary motor;
    a controller operable to obtain a difference between a current command value calculated based at least in part on the vehicle speed and the steering torque and the value of the motor current actually flowing through the auxiliary motor, and to perform PWM control of the operation of the auxiliary motor;
    a motor current hold section operable to hold the value of the motor current detected by the motor current detector;
    a switching device between the motor current detector and the motor current hold section;
    wherein the controller is operable to sample the motor current value detected by the motor current detector at a sampling start timing and to turn on the switching device to start the holding of the value of the motor current in the motor current hold section;
    wherein the controller is operable to fetch the motor current value held in the motor current hold section at a hold timing and to turn off the switching device; and
    wherein the sampling start timing and the hold timing are variable.

2. An electric power steering apparatus comprising:
    a vehicle speed sensor operable to detect a vehicle speed;
    a torque sensor operable to detect a steering torque of a steering member;
    a steering auxiliary motor configured to provide torque for steering assistance;
    a motor current detector operable to detect a value of a motor current actually flowing through the auxiliary motor;
    a controller operable to obtain a difference between a current command value calculated based at least in part on the vehicle speed and the steering torque and the value of the motor current actually flowing through the auxiliary motor, and to perform PWM control of the operation of the auxiliary motor;
    a motor current hold section operable to hold the value of the motor current detected by the motor current detector;
    a switching device between the motor current detector and the motor current hold section;
    wherein the controller is operable to sample the motor current value detected by the motor current detector at a sampling start timing and to turn on the switching device to start the holding of the value of the motor current in the motor current hold section;
    wherein the controller is operable to fetch the motor current value held in the motor current hold section at a hold timing and to turn off the switching device; and
    wherein at least one of the start timing and the hold timing are determined based at least in part on at least one of a rise or a fall of a PWM signal of the PWM control.

3. The electric power steering apparatus according to claim 2, wherein a sampling time between the sampling start timing and the hold timing is a predetermined fixed time period, and the hold timing is synchronized with or immediately before a fall of the PWM signal.

4. The electric power steering apparatus according to claim 2, wherein the sampling start timing is synchronized with a rise of the PWM signal, and the hold timing is synchronized with a fall of the PWM signal.

5. The electric power steering apparatus according to claim 2, wherein the center of the sampling time matches the center of a pulse width of the PWM signal, and the sampling time is fixed.

6. The electric power steering apparatus according to claim 2, wherein the sampling start timing occurs before the center of a pulse width of the PWM signal, and the hold timing matches the center of the pulse width of the PWM signal.

7. The electric power steering apparatus according to claim 2, wherein the sampling start timing and the hold timing are determined differently in a large current region and a small current region, wherein in the large current region the sampling start timing occurs before a rise of the PWM signal and the hold timing matches the center of a pulse width of the PWM signal, and wherein in the small current region the sampling start timing is synchronized with a rise of the PWM signal and the hold timing is synchronized with a fall of the PWM signal.

8. The electric power steering apparatus according to claim 2, wherein the sampling start timing and the hold timing are determined differently in a large current region and a small current region, wherein in the large current region the sampling start timing is synchronized with a rise of the PWM signal and the hold timing is synchronized with a fall of the PWM signal, and wherein in the small current region the sampling start timing occurs before a rise of the PWM signal and the hold timing is synchronized with a fall of the PWM signal.

9. The electric power steering apparatus according to claim 8, wherein the sampling time is fixed in the small current region.

10. The electric power steering apparatus according to claim 2, and further comprising:
a motor current output section which includes an operational amplifier, which reads a value held in the motor current hold section, which amplifies and outputs the read value to the controller; and
an offset circuit which annihilates an offset voltage in the operational amplifier;
wherein the offset circuit includes:
a boosting power supply operable to boost a voltage of a power supply;
a first resistance with one side connected to a positive side of the boosting power supply;
a zener diode with a cathode side connected to the other side of the first resistance and an anode side connected to the positive side of the power supply; and
a second resistance located between a cathode of the zener diode and an input terminal of the operational amplifier.

11. The electric power steering apparatus according to claim 3, and further comprising:
a motor current output section which includes an operational amplifier, which reads a value held in the motor current hold section, which amplifies and outputs the read value to the controller; and
an offset circuit which annihilates an offset voltage in the operational amplifier;
wherein the offset circuit includes:
a boosting power supply operable to boost a voltage of a power supply;
a first resistance with one side connected to a positive side of the boosting power supply;
a zener diode with a cathode side connected to the other side of the first resistance and an anode side connected to the positive side of the power supply; and
a second resistance located between a cathode of the zener diode and an input terminal of the operational amplifier.

12. The electric power steering apparatus according to claim 4, and further comprising:
a motor current output section which includes an operational amplifier, which reads a value held in the motor current hold section, which amplifies and outputs the read value to the controller; and
an offset circuit which annihilates an offset voltage in the operational amplifier;
wherein the offset circuit includes:
a boosting power supply operable to boost a voltage of a power supply;
a first resistance with one side connected to a positive side of the boosting power supply;
a zener diode with a cathode side connected to the other side of the first resistance and an anode side connected to the positive side of the power supply; and
a second resistance located between a cathode of the zener diode and an input terminal of the operational amplifier.

13. The electric power steering apparatus according to claim 5, and further comprising:
a motor current output section which includes an operational amplifier, which reads a value held in the motor current hold section, which amplifies and outputs the read value to the controller; and
an offset circuit which annihilates an offset voltage in the operational amplifier;
wherein the offset circuit includes:
a boosting power supply operable to boost a voltage of a power supply;
a first resistance with one side connected to a positive side of the boosting power supply;
a zener diode with a cathode side connected to the other side of the first resistance and an anode side connected to the positive side of the power supply; and
a second resistance located between a cathode of the zener diode and an input terminal of the operational amplifier.

14. The electric power steering apparatus according to claim 6, and further comprising:
a motor current output section which includes an operational amplifier, which reads a value held in the motor current hold section, which amplifies and outputs the read value to the controller; and
an offset circuit which annihilates an offset voltage in the operational amplifier;
wherein the offset circuit includes:
a boosting power supply operable to boost a voltage of a power supply;
a first resistance with one side connected to a positive side of the boosting power supply;
a zener diode with a cathode side connected to the other side of the first resistance and an anode side connected to the positive side of the power supply; and
a second resistance located between a cathode of the zener diode and an input terminal of the operational amplifier.

15. The electric power steering apparatus according to claim 7, and further comprising:
- a motor current output section which includes an operational amplifier, which reads a value held in the motor current hold section, which amplifies and outputs the read value to the controller; and
- an offset circuit which annihilates an offset voltage in the operational amplifier;
- wherein the offset circuit includes:
  - a boosting power supply operable to boost a voltage of a power supply;
  - a first resistance with one side connected to a positive side of the boosting power supply;
  - a zener diode with a cathode side connected to the other side of the first resistance and an anode side connected to the positive side of the power supply; and
  - a second resistance located between a cathode of the zener diode and an input terminal of the operational amplifier.

16. The electric power steering apparatus according to claim 8, and further comprising:
- a motor current output section which includes an operational amplifier, which reads a value held in the motor current hold section, which amplifies and outputs the read value to the controller; and
- an offset circuit which annihilates an offset voltage in the operational amplifier;
- wherein the offset circuit includes:
  - a boosting power supply operable to boost a voltage of a power supply;
  - a first resistance with one side connected to a positive side of the boosting power supply;
  - a zener diode with a cathode side connected to the other side of the first resistance and an anode side connected to the positive side of the power supply; and
  - a second resistance located between a cathode of the zener diode and an input terminal of the operational amplifier.

17. The electric power steering apparatus according to claim 9, and further comprising:
- a motor current output section which includes an operational amplifier, which reads a value held in the motor current hold section, which amplifies and outputs the read value to the controller; and
- an offset circuit which annihilates an offset voltage in the operational amplifier;
- wherein the offset circuit includes:
  - a boosting power supply operable to boost a voltage of a power supply;
  - a first resistance with one side connected to a positive side of the boosting power supply;
  - a zener diode with a cathode side connected to the other side of the first resistance and an anode side connected to the positive side of the power supply; and
  - a second resistance located between a cathode of the zener diode and an input terminal of the operational amplifier.

* * * * *